(12) United States Patent
Apisdorf

(10) Patent No.: US 6,671,832 B1
(45) Date of Patent: Dec. 30, 2003

(54) METHOD AND APPARATUS FOR PERFORMING ERROR CHECKING IN A NETWORK

(75) Inventor: Joel Z. Apisdorf, Reston, VA (US)

(73) Assignee: WorldCom, Inc., Clinton, MS (US)

(*) Notice: Subject to any disclaimer, the term of this patent is extended or adjusted under 35 U.S.C. 154(b) by 0 days.

(21) Appl. No.: 09/468,462

(22) Filed: Dec. 21, 1999

Related U.S. Application Data

(63) Continuation-in-part of application No. 09/430,094, filed on Oct. 29, 1999, now Pat. No. 6,480,977.

(51) Int. Cl.[7] .............................................. G06F 11/08
(52) U.S. Cl. ........................................ 714/52; 714/758
(58) Field of Search ................... 714/52, 48, 758–776, 714/807, 781; 370/395

(56) References Cited

U.S. PATENT DOCUMENTS

| | | | |
|---|---|---|---|
| 4,979,174 A | 12/1990 | Cheng et al. ................. 371/41 |
| 5,345,451 A | 9/1994 | Uriu et al. ..................... 371/42 |
| 5,805,571 A | 9/1998 | Myers et al. | |
| 5,812,529 A | 9/1998 | Czarnik et al. | |
| 5,844,923 A | 12/1998 | Condon ..................... 371/47.1 |
| 5,850,388 A | 12/1998 | Anderson et al. | |
| 5,878,057 A | 3/1999 | Maa ........................... 371/37.6 |
| 5,917,828 A | 6/1999 | Thompson .................. 370/474 |
| 5,951,707 A | * 9/1999 | Christensen et al. ........ 714/752 |
| 6,115,393 A | 9/2000 | Engel et al. | |
| 6,161,207 A | * 12/2000 | Lockhart et al. ............ 714/758 |
| 6,357,032 B1 | * 3/2002 | Plotz et al. .................. 714/758 |
| 6,480,977 B1 | * 11/2002 | Apisdorf et al. ............ 714/712 |

FOREIGN PATENT DOCUMENTS

| EP | 0477448 | 4/1992 |
|---|---|---|
| EP | 0810807 | 12/1997 |
| WO | 98/36532 | 8/1998 |

OTHER PUBLICATIONS

Keiser et al., "Test Traffic Generation Equipment and Algorithms for Evaluating ATM Networks", Computer Communications, Elsevier Science Publishers BV, Amstterdam, NL, Oct. 1, 1996, vol. 19, No. 12, pp. 962–971.
RADCOM Application Note AN–49/94, "How to Test SONET/SDH Lines Using the RC–200–C", pp. 1–9.
RADCOM Application Note AN–9/95, "How to Test Interim Local Management Interface Using the RC–200–C", pp. 1–12.
RADCOM Application Note AN–52/94, "How to Analyze LAN Traffic Over ATM Using the RC–200–C", pp. 1–6.
Morrisey, P., "Four ATM Analyzers to Troubleshoot Your Network", Network Computing, pp. 1–6.
Wandel & Goltermann, Application Note, "Using a Web browser to connect the DominoServer", pp. 1–3.
Wandel & Golterman, Advanced Network Testing Magazine, Issue 3, pp. 1–7.
RADCOM Product Note, "Wire Speed 622 ATM Protocol Analyzer", pp. 1–4.
Wandel & Goltermann, Application Note, "Qecc Protocol Analysis of OC–N/STM–N networks", pp. 1–2.

(List continued on next page.)

Primary Examiner—Scott Baderman

(57) ABSTRACT

A system and method for checking for data transmission errors in a network includes a cyclic redundancy code (CRC) generator and a processing device. The CRC generator receives a stream of data representing cells in a packet of data. The CRC generator generates a CRC value for each cell and transmits the CRC value to a processing device. The processing device combines the cell CRC values to generate a CRC for a packet of data. The processing device then compares the packet CRC to an expected value to determine whether an error occurred in the data transmission.

21 Claims, 10 Drawing Sheets

OTHER PUBLICATIONS

Wandel & Goltermann, Application Note, "Protocol Analysis of user data encapsulated within OC–N/STM–N networks", pp. 1–3.

Wandel & Goltermann White Paper, "What is a Protocol Analyzer", pp. 1–10.

Hewlett Packard News Release, "HP Introduces First Solutions for Packet over SONET/SDH Testing from 155Mb/s to 2.4 Gb/s", pp. 1–2.

* cited by examiner

METHOD AND APPARATUS FOR PERFORMING ERROR CHECKING IN A NETWORK

RELATED APPLICATION

This application is a Continuation-in-Part of application Ser. No. 09/430,094, filed Oct. 29, 1999, now U.S. Pat. No. 6,480,977 by Joel Apisdorf, entitled MULTI-PROTOCOL MONITOR, the entirety of which is incorporated herein by reference.

FIELD OF THE INVENTION

The present invention relates to telecommunication networks and, more particularly, to monitoring data transmissions for errors.

BACKGROUND OF THE INVENTION

In conventional Asynchronous Transfer Mode (ATM) networks, data is transmitted as packets having variable lengths. Packet lengths may range from around 20 bytes to over 65,000 bytes. The data packet is typically transmitted with an error checking code, such as a cyclic redundancy code (CRC). The CRC is conventionally attached to the end of the packet after the user data and is used to detect corruption of the transmitted data packet.

The ATM packets may be transmitted in a network such as a synchronous optical network (SONET). In this case, the packet is broken down into a number of cells having a fixed length. The last cell in the packet normally includes the CRC. A receiver receives the cells and checks for transmission errors using the transmitted CRC. While the receiver is able to determine whether an error occurred in the data transmission, the receiver is unable to localize the error. That is, the receiver cannot identify a particular portion of the packet that contains the erroneous data. Being able to determine where an error occurred in the data transmission often facilitates determining the cause of the error. Additionally, knowing where an error occurred often simplifies the troubleshooting and fixing of any problems in the network.

SUMMARY OF THE INVENTION

There exists a need for a system and method that facilitates error checking in a network.

This and other needs are met by the present invention, where a CRC generator generates a CRC for each cell transmitted in a stream of data. The CRC for each cell is then combined with the CRC for other cells in the same packet of data to generate an overall CRC for the packet. The packet CRC may then be checked against an expected value to identify whether an error occurred in the packet transmission.

According to one aspect of the invention, a method for checking a data transmission for errors is provided. The method includes receiving a stream of data comprising a plurality of cells, each cell including a header portion and a data portion, the header portion including a virtual path identifier (VPI) and a virtual channel identifier (VCI). The method also includes stripping the header portion from each of the plurality of cells, generating a cyclic redundancy code (CRC) for the data portion of each of the plurality of cells and calculating an overall CRC for a group of cells having the same VPI and VCI. The method further includes comparing the overall CRC to an expected value.

Another aspect of the present invention provides a system for checking for errors in a packet of data transmitted over a network. The system includes a CRC generator configured to receive a stream of data comprising a plurality of cells and generate a CRC value for each of the plurality of cells. The system also includes a processing device coupled to the CRC generator and configured to receive the CRC value for each of the plurality of cells, generate a packet CRC for a group of cells forming a packet of data, and compare the packet CRC to an expected value.

Other features and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

DETAILED DESCRIPTION

The present invention will be described with the example of a network monitoring system monitoring an optical link in a synchronous optical network (SONET). A description will first be given of the monitoring system architecture and operations, followed by a detailed description of the method and apparatus for performing error checking. It will become apparent, however, that the present invention is also applicable to other types of networks, as described in detail below, as well as to other types of systems in general.

Monitoring System Overview

Figure 1:
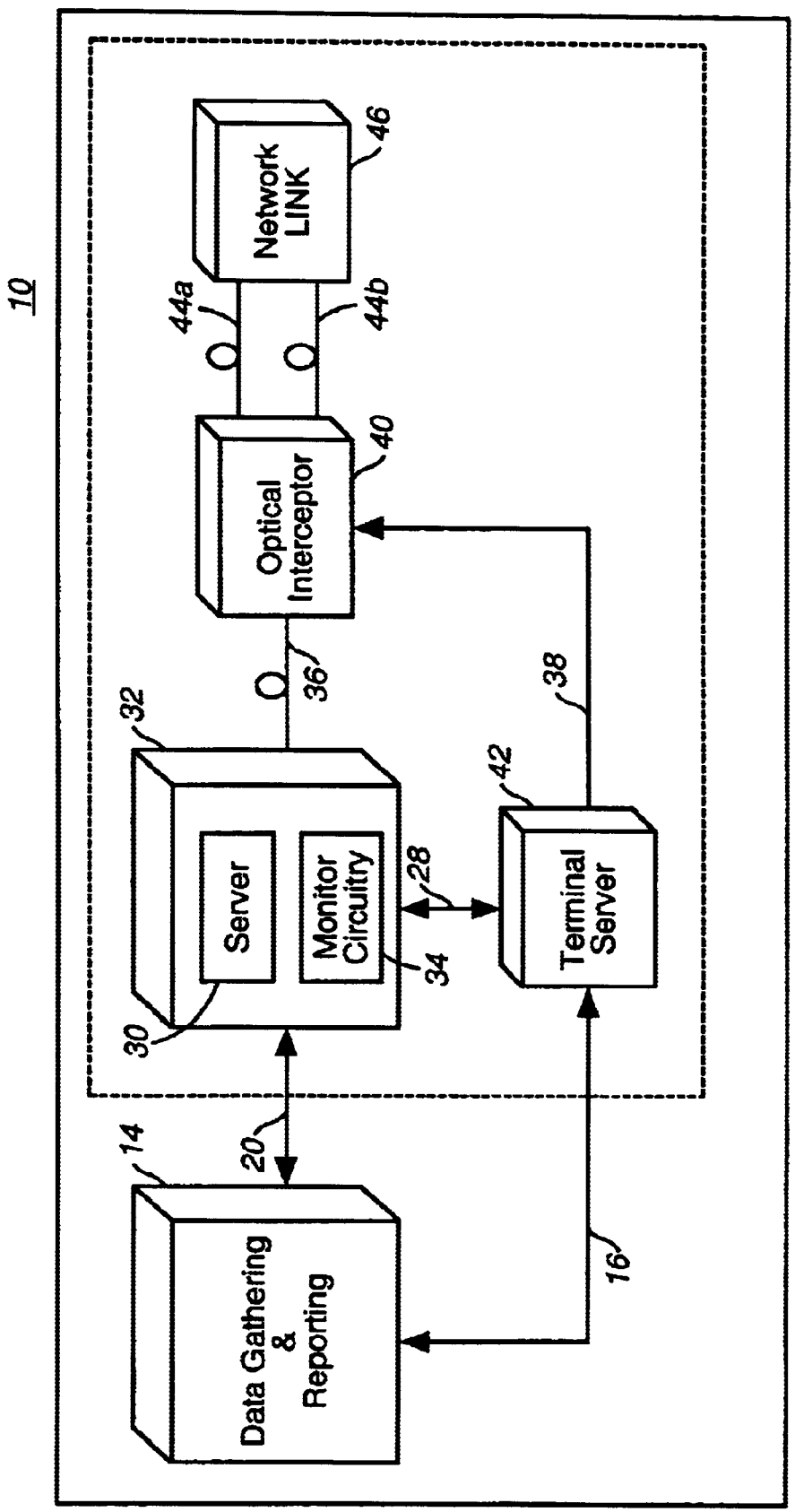
FIG. 1 is a block diagram of a multi-protocol optical link monitoring system in which the present invention may be employed.

FIG. 1 is an exemplary multi-protocol monitoring system 10 in which systems and methods consistent with the present invention may be advantageously employed. Multi-protocol monitoring system 10 includes an information carrying network optical link 46, which may be an optical link of a conventional optical network such as a SONET. Systems and methods consistent with the present invention, however, may be used with other data networks.

Multi-protocol monitoring system 10 also includes monitor processor system 32, optical interceptor 40, terminal server 42 and data gathering and reporting block 14. Optical interceptor 40 intercepts a portion of the information traffic that is carried in a selected optical link, such as network link 46. Optical interceptor 40 automates the task of fiber/channel selection, under the control of terminal server 42 via communication line 38, and intercepts the traffic information of selected network link 46 by way of duplex optical links 44a and 44b. Terminal server 42 communicates with monitor processor system 32 via communication bus 28.

While optical interceptor 40 may intercept all data packets transmitted through network optical link 46, systems and methods consistent with the present invention select only portions of the overall link traffic for processing. Optical interceptor 40 transmits the intercepted data traffic via duplex optical link 36 to monitor processor system 32.

Monitor processor system 32 includes server 30 and traffic monitor circuitry 34. The monitor processor system 32 gathers and analyzes the intercepted traffic data from optical interceptor 40. Additionally, monitor processor system 32 transmits selected data to data gathering and reporting block 14 via communication line 20. Data gathering and reporting block 14 also communicates with terminal server 42 via communication line 16, in addition to communicating with other systems external to multi-protocol monitoring system 10.

The multi-protocol monitoring system 10 may be used to perform traffic engineering. In this scenario, the monitor processor system 32 determines, for example, how much traffic is transmitted through the link from which the information applied to monitor processor system 32 is intercepted. The monitor processor system 32 may then determine whether there are any other methods of traffic handling that may be more efficient than the methods currently being used. This information can then be used to improve network management and network operations.

Figure 2:
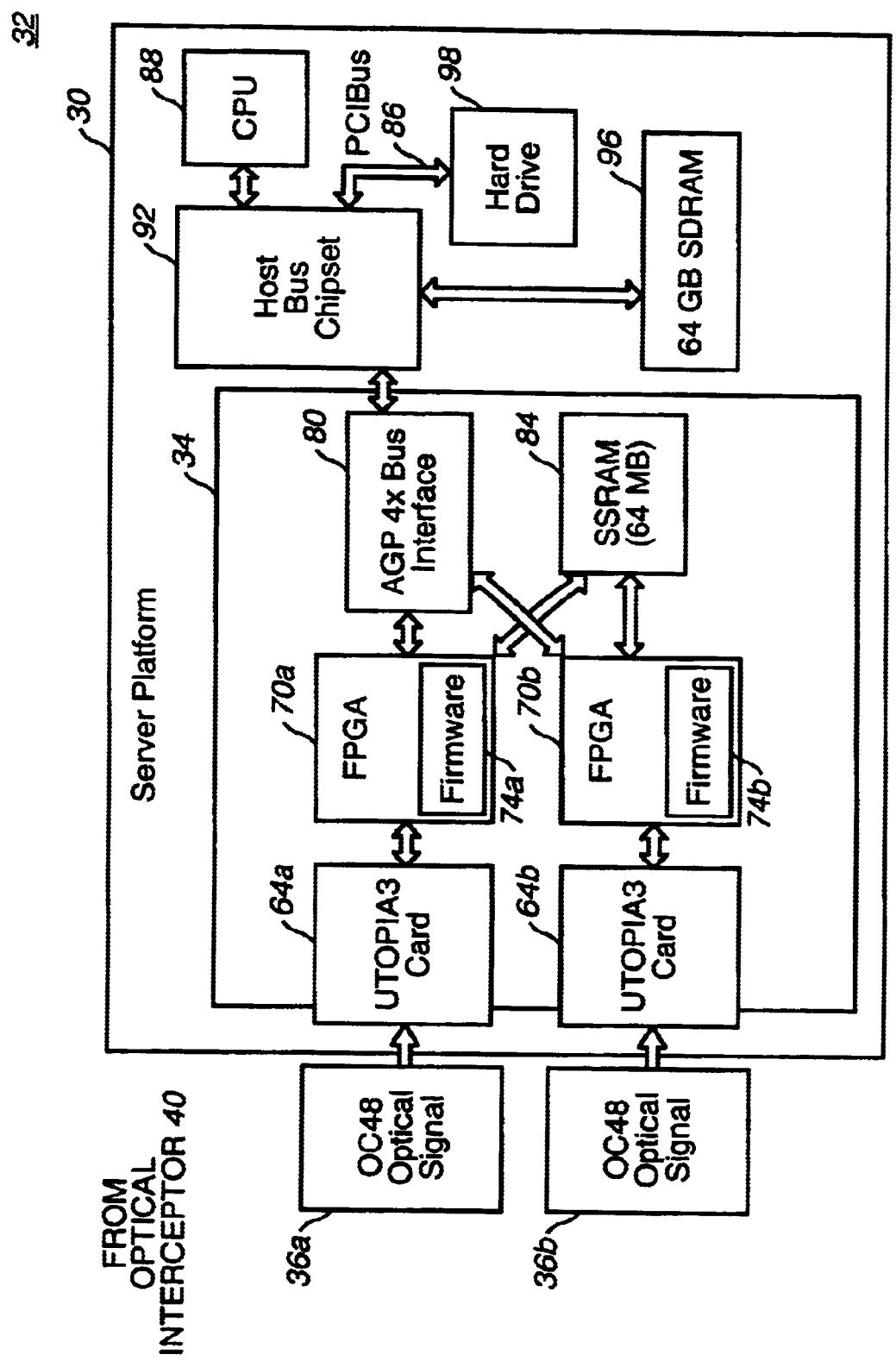
FIG. 2 is a block diagram representing a traffic monitoring system suitable for use within the multi-protocol optical link monitoring system of FIG. 1.

FIG. 2 illustrates an exemplary monitor processor system 32 consistent with the present invention and employed within multi-protocol monitoring system 10. Monitor processor system 32 includes server platform 30, also referred to as the server or host 20 computer, and traffic monitor circuitry 34.

Server 30 can be a conventional desktop computer, a minicomputer system or a mainframe computer. Server 30 includes central processing unit (CPU) 88, memory 96, and disc drive 98, also referred to as the hard drive. The memory 96 may be a conventional random access memory (RAM) for storing information and instructions to be executed by CPU 88. Memory 96 may also store temporary variables or other intermediate information used during execution of instructions by CPU 88. The hard drive 98 may also store static information and instructions for CPU 88. Server 30 also includes a host bus chipset 92. Conventional peripheral component interconnect (PCI) bus 86 couples hard drive 98 to host bus chipset 92 within server 30. The traffic monitor circuitry 34 may be implemented as a monitoring card in server 30. The traffic monitor circuitry 34 is coupled to the host bus chipset 92 via accelerated graphics port (AGP) bus interface 80. AGP bus interface 80 is a point-to-point bus that provides a fast interface between traffic monitor circuitry 34 and host bus chipset 92. AGP bus interface 80 includes a conventional PCI bus as its base architecture and increases interface throughput by clocking the PCI architecture at higher speeds. The AGP interface 80 also provides additional address lines in order to pipeline bus transactions.

The optical interceptor 40 (FIG. 1) transmits the intercepted signals to optical-to-electrical converters 64a and 64b via optical links 36a and 36b, respectively. Optical links 36a and 36b are illustrated as transmitting signals in an optical carrier level 48 (OC-48) system. However, systems and methods consistent with the present invention support other OC levels and other optical networks. Optical-to-electrical converters 64a and 64b perform the optical-to-electrical conversion of both the receive and transmit signals of monitor processor system 32. The converters 64a and 64 are shown as conventional UTOPIA3 cards. However, other converters or subsystems may also be employed in traffic monitor circuitry 34. Additionally, framers within cards 64a and 64b handle the conventional overhead traffic of optical network link 46. The framers also perform the decapsulation and encapsulation of the payloads of network link 46.

Cards 64a and 64b are coupled to field programmable gate arrays 70a and 70b, respectively. Field programmable gate arrays (FPGAs) 70a and 70b are conventional gate arrays and include a large number of configurable logic blocks (CLBs). The CLBs of field programmable gate arrays 70a and 70b can be configured and connected to provide circuitry that performs functions of, for example, counters, multiplexers, FIFOs and byte scramblers, etc. Files that configure and reconfigure gate arrays 70a and 70b can be repeatedly downloaded to traffic monitor circuitry 34, for example to firmware 74a and 74b in FPGAs 70a and 70b, respectively, under the control of server 30. The ability to repeatedly reconfigure gate arrays 70a and 70b permits traffic monitor circuitry 34 to perform many different applications, based on user requirements.

Synchronous static RAM (SSRAM) 84 is coupled to gate arrays 70a and 70b. The SSRAM 84 stores information packets and cells intercepted by optical link 40 and transferred to traffic monitor circuitry 34. Additionally, SSRAM 84 may store reassembly states during the reassembly of a data packet by traffic monitor circuitry 34.

A well-known transmission mode suitable for transmissions through networks, such as network link 46, is the asynchronous transfer mode (ATM). In ATM networks, data may be transmitted as packets ranging from 28 to over 65,000 bytes in length. However, in a commonly used ATM method the cells are fifty-three bytes long with only forty-eight bytes being available for the user data. The user information is broken down to fit into the ATM cells prior to transmission. An advantage of this ATM mode is that a transmission link carrying the ATM information can be completely filled with cells. When transmitting using ATM, each cell is provided with a header and routed through the network according to its header.

The multi-protocol monitoring system 10 receives the header information and is able to analyze the packets as a whole when analyzing the intercepted data. FPGAs 70a and 70b may be used to perform this analysis process. Other operations related to ATM cell processing that can be performed by FPGAs 70a and 70b include, but are not limited to, selection and time stamping of information cells.

Another well-known transmission mode suitable for transmission through networks such as network link 46 is the Packet Over SONET (POS) mode, where the bytes of a packet are all sent on the link together. Thus, there is no need for more than one reassembly state to be maintained by monitor processor system 32. This frees up the on-card memory, such as SSRAM 84, for other uses. In POS mode, however, the point-to-point protocol (PPP) header does not include a length field. Thus, it may be useful to provide such a length field at the beginning of the packet.

Figure 3:
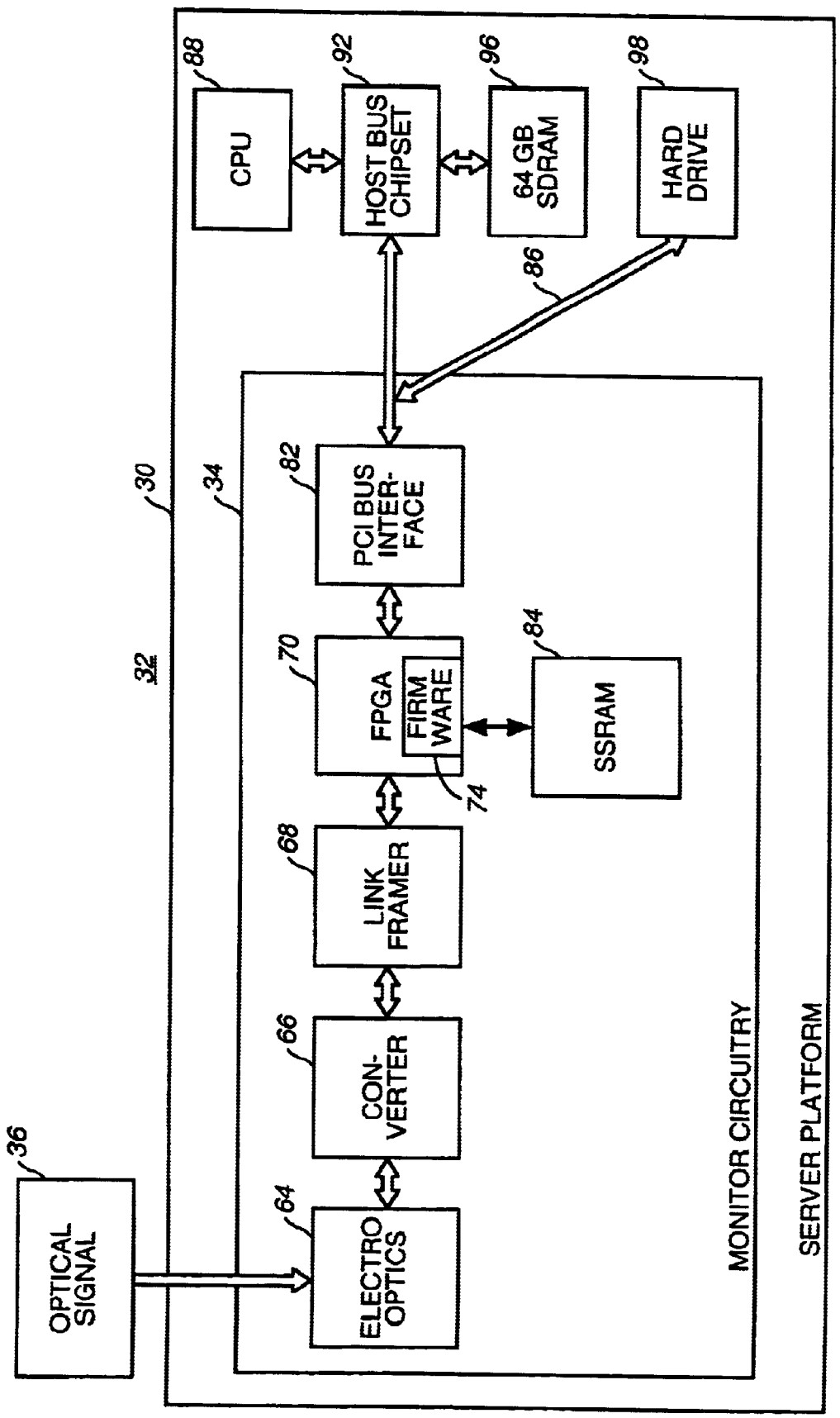
FIG. 3 is a block diagram of an alternate implementation of the traffic monitoring system of FIG. 2.

FIG. 3 illustrates an alternate embodiment of monitor processor system 32 within multi-protocol monitoring system 10. Referring to FIG. 3, the optical signals of optical link 36 are transmitted to serial-to-parallel converter 66 via electro-optics 64. Optional multiplexer/demultiplexer devices for processing the received signals may also be employed in embodiments consistent with the present invention. Link framer 68 receives the output of converter 66. The framing of the information of the intercepted network link 46 permits the server 30 to distinguish such signals as user data signals and link overhead signals. FPGA 70 is coupled to link framer 68 and operates substantially the same as the framers in cards 64*a* and 64*b* (FIG. 2). Conventional PCI bus interface 82 and PCI bus 86 provide an interface between server platform 30 and traffic monitor circuitry 34, as opposed to the AGP bus in FIG. 2. The bandwidth of the PCI bus is less than the AGP bus. Therefore, the implementation in FIG. 3 includes a single set of electro-optics 64, as opposed to the two sets of electro-optics in FIG. 2.

Monitor processor system 32 also includes SSRAM 84 coupled to FPGA 70. SSRAM 84 operates similarly to SSRAM 84 described in relation to FIG. 2. Server 30 also includes CPU 88, host bus chipset 92, memory 96 and hard drive 98. These components operate in a similar manner to their respective counterpart elements discussed in relation to FIG. 2. Furthermore, it will be understood by those skilled in the art that any of the various buses of system 10 can be bi-directional in order to permit system 10 to transmit signals onto network link 46 as well as intercept signals from network link 46.

Error Checking

The foregoing description of the multi-protocol monitoring system 10 provides an overview of the system's architecture and operations in an optical network. A more detailed description of the features of the present invention as embodied in the multi-protocol monitoring system 10 is provided below. The invention will be described in connection with a SONET operating according to an ATM adaption layer 5 (AAL-5) format. However, it should be understood that the present invention may also be used in other SONET environments in addition to other optical networks. It should also be understood that the present invention may be used in any network monitoring system.

As described previously, ATM packets may be over 65,000 bytes in length. In a typical packet, eight bytes of control and error checking information are appended to the packet after the user data. According to an AAL-5 standard format, the AAL divides the packet into fixed length cells. Each cell is 53 bytes in length and includes a header portion and a payload portion. The header portion contains routing information for routing the data. Cells from various sources are then interspersed with other cells and are transmitted in a stream of data. The cell headers separate the individual cells.

Figure 4A:
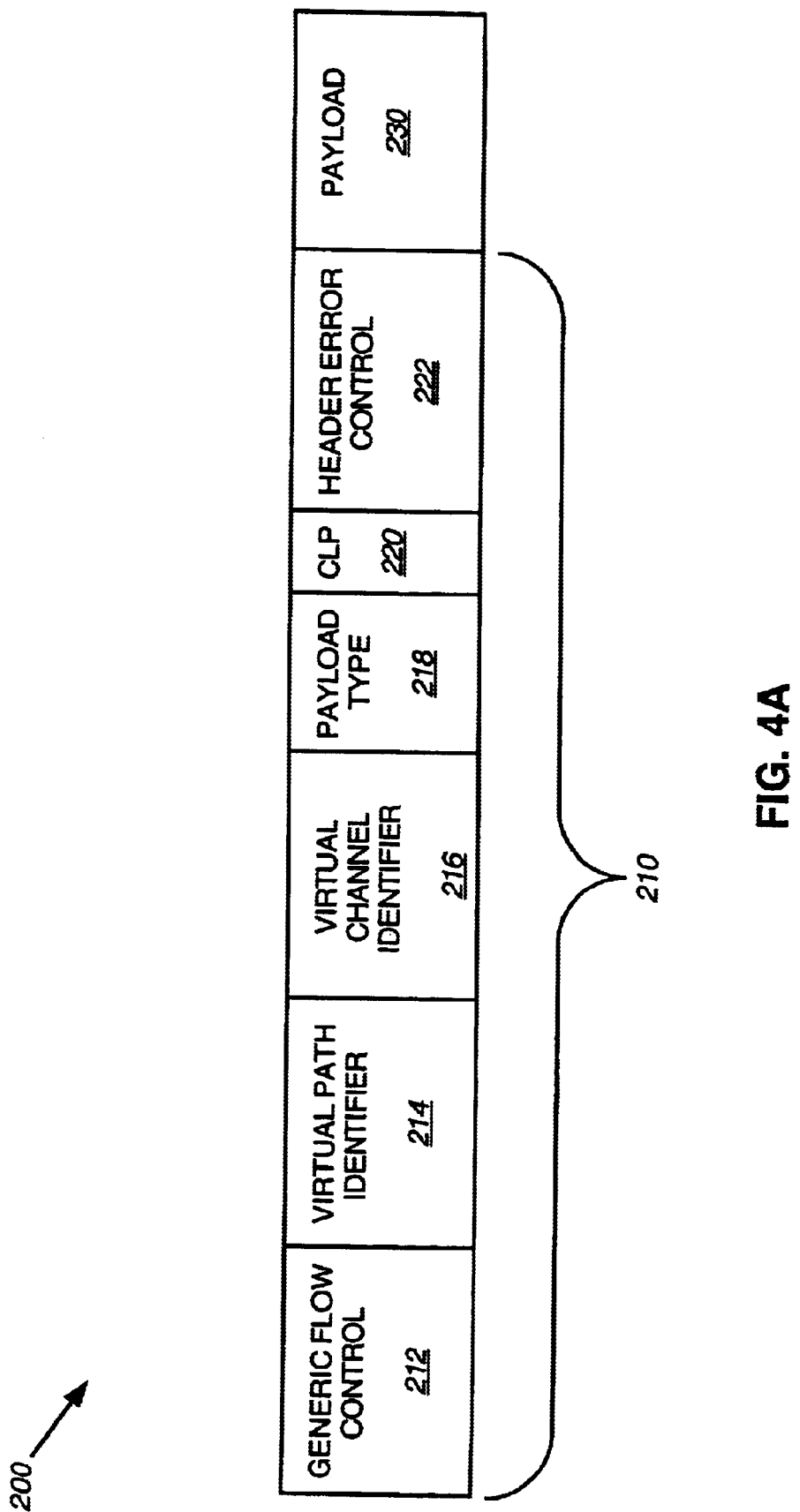
FIG. 4A is a diagram of an ATM cell transmitted in a SONET according to AAL-5 format.

FIG. 4A illustrates an exemplary ATM cell format for multiple data cells transmitted according to AAL-5. Each cell 200 is 53 bytes in length and includes a 5-byte header 210 and a 48-byte payload 230. The ATM header 210 includes a generic flow control (GFC) field 212, a virtual path identifier (VPI) 214, a virtual channel identifier (VCI) 216, a payload type identifier (PT) 218, a cell loss priority (CLP) field 220, and a header error control (HEC) field 222.

The GFC field 212 is used to ensure that users are given fair access to transmission facilities. The VPI 214 identifies a virtual path between two nodes. The virtual path is simply a collection of channels associated with the same user endpoints. The VCI 216 identifies a virtual channel between two nodes. A virtual channel is a unidirectional virtual circuit associated with a particular user. The PT field 218 is used to differentiate between cells carrying user data and cells carrying ATM control information, such as operation administration and maintenance (OAM) cells. The CLP field 220 indicates the eligibility of a cell being discarded during a period of congestion. The HEC field 222 includes a cyclic redundancy code (CRC) and is used to detect corruption of information contained in the ATM header 210. The payload field 230 contains 48 bytes of user data.

Figure 4B:
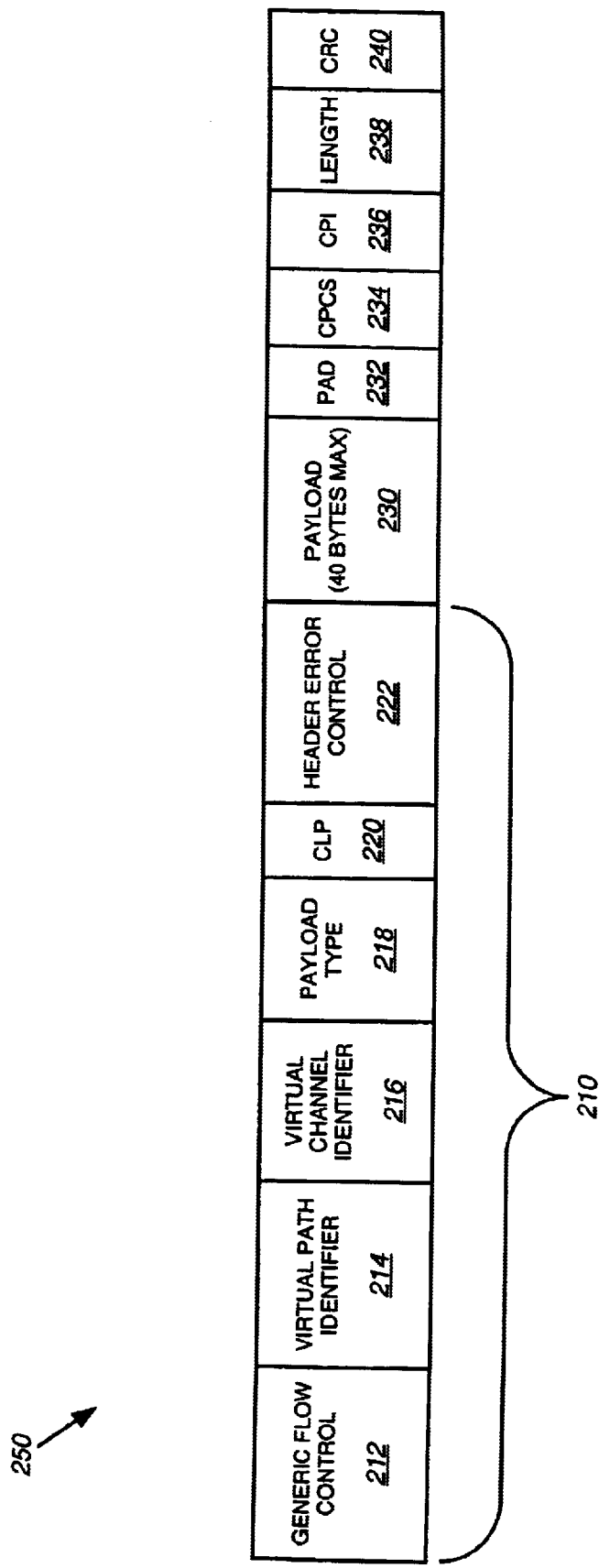
FIG. 4B is a diagram of the last cell in an ATM packet transmitted in a SONET according to AAL-5 format.

FIG. 4B illustrates an exemplary ATM cell format for the last data cell 250 in an ATM packet transmitted according to AAL-5. Cell 250 includes the same fields 212, 214, 216, 218, 220 and 222 as cell 200. For the last cell 250 in a packet, the payload type field 218 indicates that the cell is the last cell. Cell 250 also includes the payload 230, pad field 232, common part convergence sublayer (CPCS) field 234, common part indicator (CPI) 236, length field 238 and CRC 240.

The payload field 230 in the last cell 250 contains a maximum of 40 bytes of user data. The pad field 232 is used to align the cell to a 48-byte boundary. The pad field 232 may be up to 39 bytes in length, depending on the length of the payload field 230, and may contain any value. The pad field 232 is included in the CRC calculation stored in CRC field 240. The payload 230 and pad 232 fields combine for 40 bytes of data. The CPCS field 234 is used to identify the user payload. The length field 238 indicates the number of bytes of the payload of the data packet.

As discussed previously, the CRC 240 may be used to detect that an error occurred during the transmission of the packet of data. The error, however, may not be localized to a particular portion of the original packet. With large data packets up to 65,000 bytes in length, the inability of conventional systems to localize the error makes troubleshooting the network difficult.

Systems and methods consistent with the present invention calculate a CRC for the 48-byte payload 230 for each cell 200 in the data stream. The CRC for the last cell 250 in a packet is also generated based on the full 48 bytes of information after the cell header 210, including the CRC 240 transmitted with the packet. The CRC for the cells are then combined to generate an overall CRC for a packet. As described in more detail below, the CRC may then be used to check whether an error occurred during transmission and to localize the error, when an error is detected.

Figure 5:
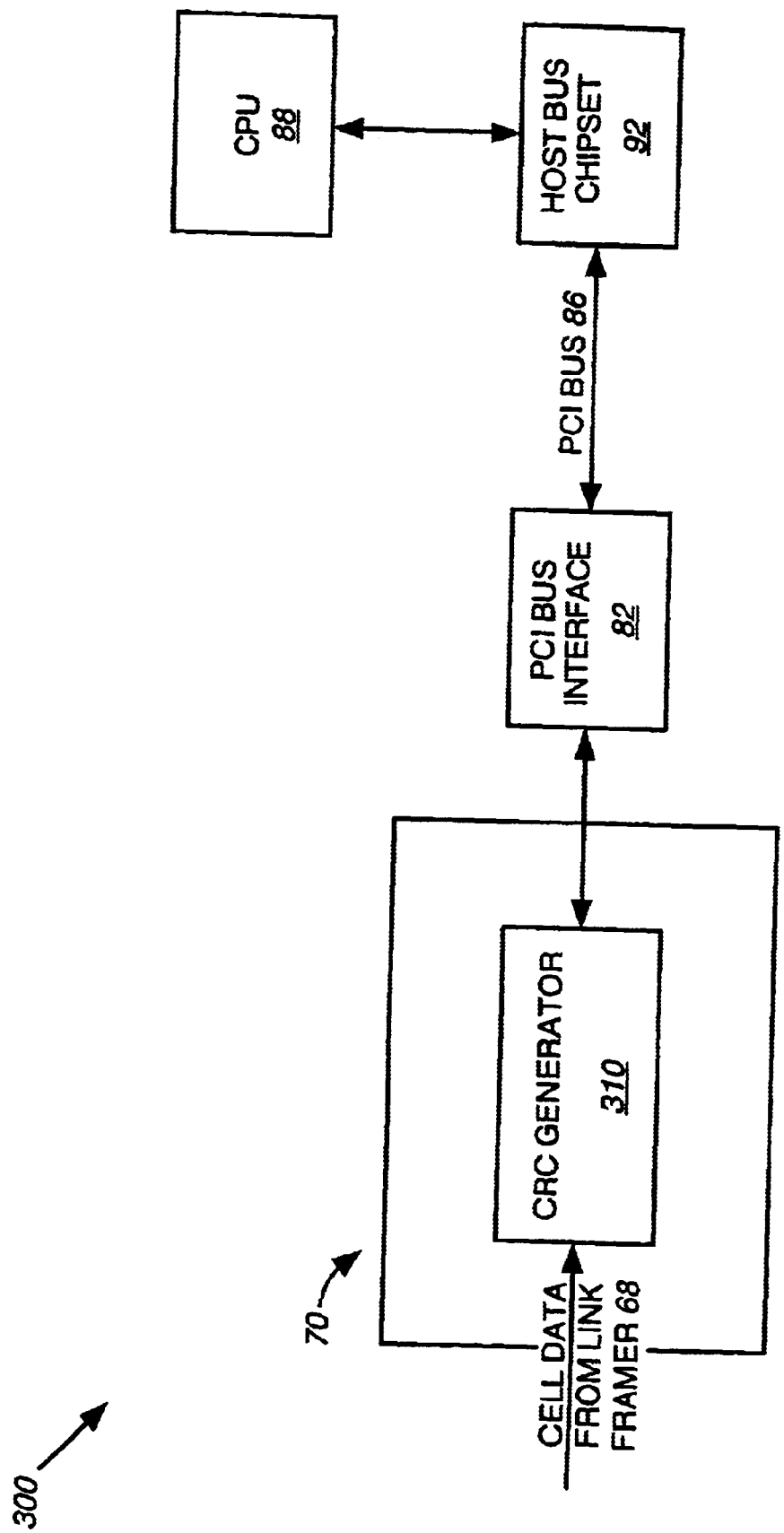
FIG. 5 is a block diagram of an error checking system consistent with the present invention.

FIG. 5 is a diagram of a system 300 consistent with the present invention for checking for errors in the data transmitted via an optical network. The system 300 includes CRC generator 310, PCI bus interface 82, PCI bus 86, host bus chipset 92 and CPU 88. In the exemplary embodiment illustrated in FIG. 5, the CRC generator 310 is shown implemented on FPGA 70 (FIG. 3). In alternative implementations consistent with the present invention, CRC generator 310 may be implemented on either one of or both of FPGAs 70*a* or 70*b* (FIG. 2) or elsewhere on traffic monitor circuitry 34. Additionally, as discussed previously, the server 30 may include any type of computer system, such as a personal computer, a minicomputer system, or a mainframe computer.

Referring to FIG. 5, the CRC generator 310 receives a stream of data from link framer 68 (FIG. 3). In an exemplary implementation consistent with the present invention, the link framer 68 strips the 5-byte cell header 210 from each of the cells and transmits the remaining 48 bytes of the cell to the CRC generator 310. In alternative implementations, firmware 74 within FPGA 70 or hardware within FPGA 70 strips the header 210 from each of the cells.

The CRC generator 310 receives the 48 bytes of data from each cell. The CRC generator 310 then calculates a CRC for each 48 byte data stream in a conventional manner, based on the particular CRC generator polynomial employed. The CRC generator 310 transmits the CRC value via PCI bus interface 82 and PCI bus 86 to host bus chipset 92. The CRC may then be transferred to CPU 88 for processing. After receiving the CRC value, the CPU 88 combines the CRCs for each cell having the same VPI/VCI, as described in more detail below, to generate an overall CRC for the original packet.

Figure 6:
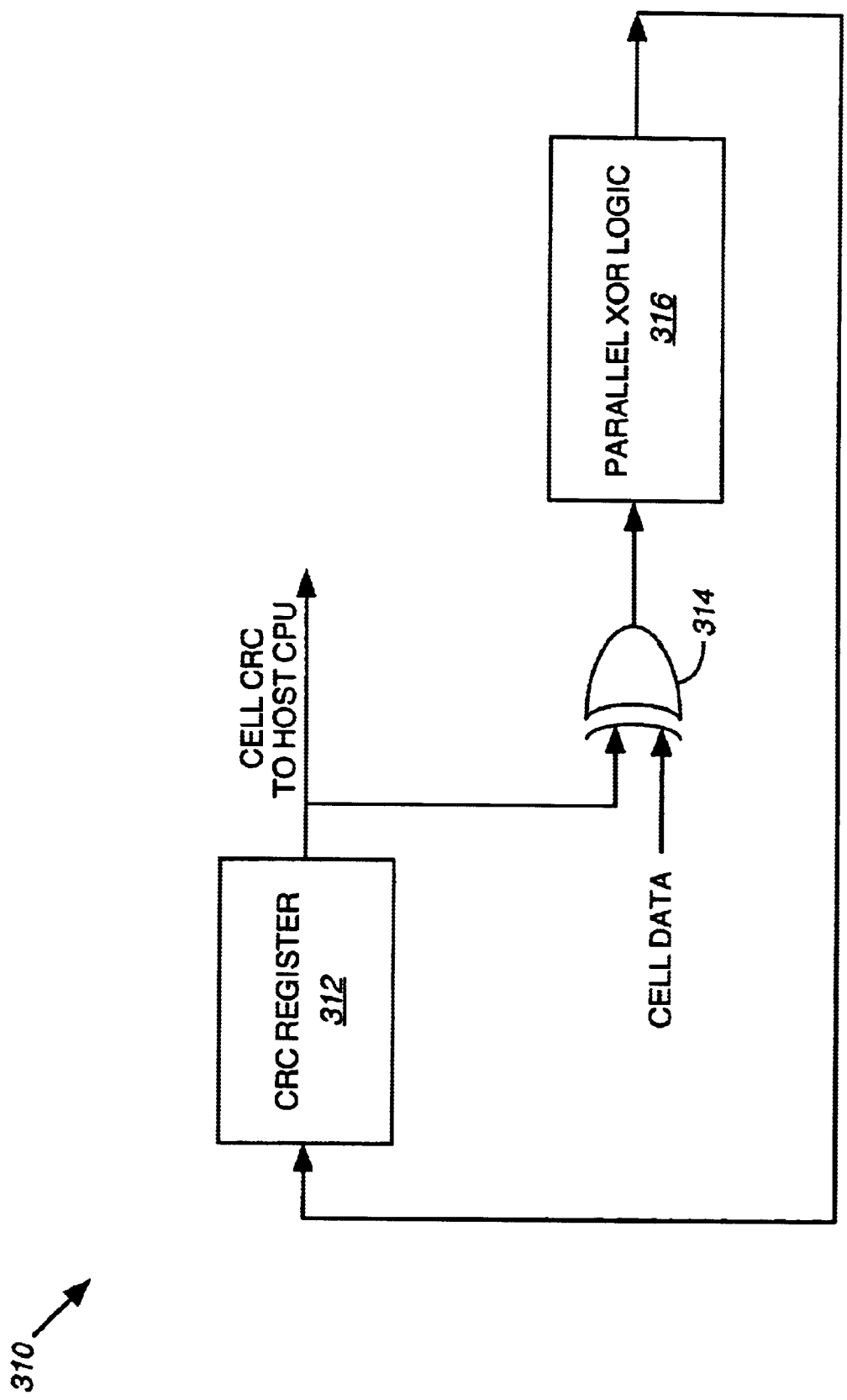
FIG. 6 is a detailed diagram of the CRC generator of FIG. 5 according to an implementation consistent with the present invention.

The CRC generator 310 calculates the CRC for the 48-byte cell payload in any conventional manner known for calculating CRC values. For example, FIG. 6 illustrates an exemplary CRC generator 310 consistent with the present invention. Referring to FIG. 6, the CRC generator 310 includes a CRC register 312, exclusive OR (XOR) gate 314 and parallel XOR logic 316. In an exemplary embodiment consistent with the invention, the CRC generator 310 generates the CRC in 32-bit increments and CRC register 312 is a 32-bit register. CRC register 312 is first initialized to zero. The XOR gate 314 receives the 48-byte payload 230 from a data cell 200 and XORs the payload 230 with the contents of the CRC register 312. The XOR gate 314 outputs the result to parallel XOR logic 316. The parallel XOR logic 316 XORs the output of the XOR gate 314 in a conventional manner, based on the particular CRC generator polynomial being employed. In typical fashion, each term in the CRC generator polynomial represents an individual XOR gate in parallel XOR logic 316.

After processing the output of XOR gate 314, the parallel XOR logic 316 outputs a CRC value for the first 32 bits (4-bytes) of the 48-byte payload to CRC register 312. The process continues for the remaining 44 bytes of the 48 byte payload 230. In other words, the CRC generator 310 continues the process described above for each 4-bytes of data eleven more times to generate a cell CRC value. A conventional counter may be used to count the 48-byte payload. After the last four bytes of the 48 bytes of data are processed, the parallel XOR logic 316 stores the result in CRC register 312. The CRC register 312 then outputs the CRC value to the server 30 for processing by CPU 88.

Exemplary Processing for Generating a CRC for Each Cell

Figure 7:
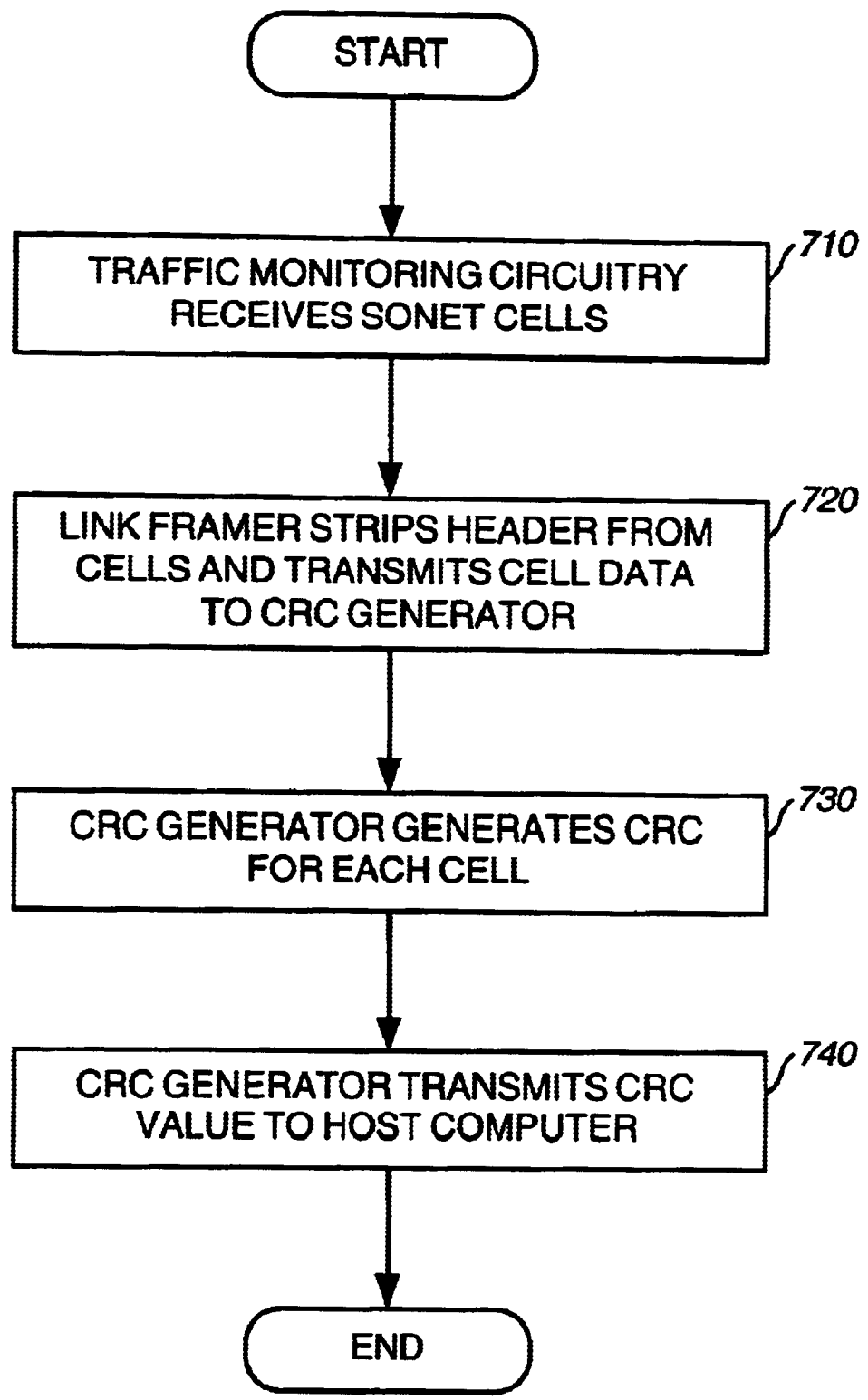
FIG. 7 is an exemplary flow diagram illustrating processing for generating a cell CRC value.

FIG. 7 is an exemplary flow diagram of processing for generating a CRC in a manner consistent with the present invention. At step 710, the traffic monitor circuitry 34 receives the SONET cells, packed according to the AAL-5 format, intercepted by optical interceptor 40.

Next at step 720, the link framer 68 strips the cell header 210 from each of the cells as they are received. The link framer 68 then transmits the remaining 48 bytes of data to the CRC generator 310. The CRC generator 310 then generates the CRC value for each 48 byte chunk of data at step 730, using a predetermined CRC generator polynomial. As discussed previously, the CRC generator 310, according to an exemplary implementation consistent with the present invention, generates the CRC four bytes at a time using CRC register 312, XOR gate 314 and parallel XOR logic 316. Any conventional CRC generator polynomial may be used and the parallel XOR logic 316 XORs the output from XOR gate 314 based on the particularly polynomial used.

The CRC generator 310 continues to generate the CRC for additional cells in the stream of data as the data is received by traffic monitor circuitry 34. When the last cell 250 in an ATM packet is received, the CRC generator 310 generates the CRC value using the full 48-bytes of data including pad field 232, CPCS field 234, CPI field 236, length field 238 and CRC field 240. In this manner, the CRC generator 310 simplifies the logic associated with generating the CRC by performing the CRC calculation in the same manner for each 48-byte chunk of data, regardless of whether the particular chunk is associated with the last cell 250 in a packet of data. Additionally, by including the CRC field 240 in the new CRC calculation, the overall CRC value for the packet calculated by the host CPU 88, as described in more detail below, equals an expected value when the particular packet is error-free.

The CRC generator 310 then transmits the CRC value to the host computer 30 at step 740. The CRC generator 310 may also transmit time stamp information, ATM header information and portions of the ATM payload to the host computer 30 to facilitate analysis by the host CPU 88. Advantageously, the CRC generator 310 saves valuable memory space, for example on traffic monitor circuitry 34, by transmitting the cell CRC value to the host computer 30 for processing.

Exemplary Process for Generating a CRC for a Packet

Figure 8:
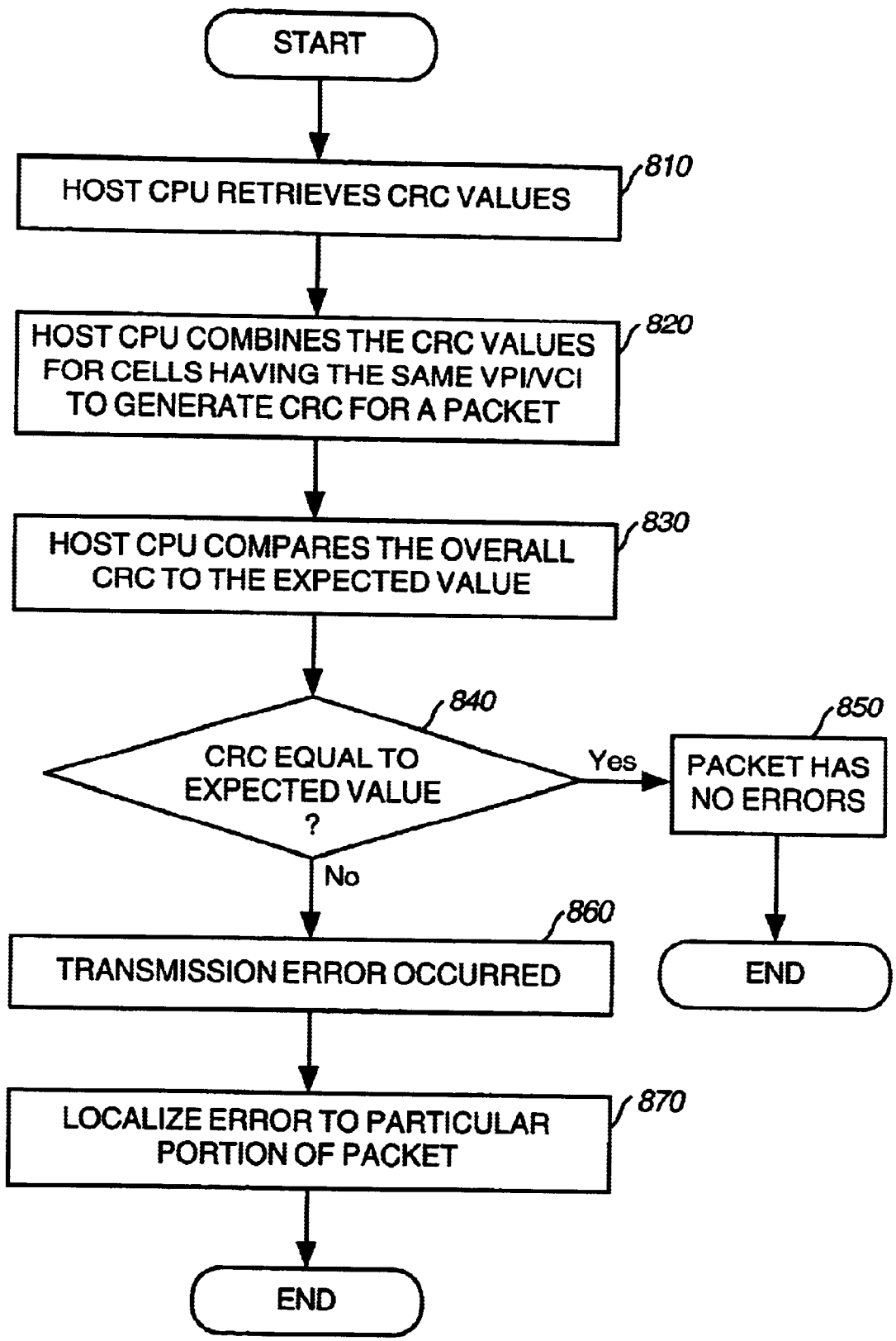
FIG. 8 is an exemplary flow diagram illustrating processing for generating a packet CRC value.

FIG. 8 is an exemplary flow diagram of processing for generating an overall packet CRC in a manner consistent with the present invention. At step 810, the CPU 88 retrieves the CRC values generated by the CRC generator 310. According to an exemplary implementation of the invention, the CRC generator 310 transmits the CRC values to the host bus chipset 92 via the PCI bus interface 82 as the cell CRC values are generated (FIG. 7, step 740). However, the CPU 88 does not retrieve the CRC values from host bus chipset 92 until a number of CRC values forming a block of data is ready for processing by the CPU 88. In this manner, the CPU 88 can process the CRC values in a more efficient manner.

Next at step 820, the host CPU 88 combines the CRC values for a group of cells having the same VPI/VCI to generate an overall CRC for a packet. More specifically, according to an exemplary implementation consistent with the present invention, the host CPU 88 first takes the CRC value calculated by CRC generator 310 for the first cell in a packet as a starting value. The host CPU 88 then calculates a CRC value for 48-bytes of zeros, using the first cell CRC as the starting value and the same CRC generator polynomial employed by CRC generator 310. Alternatively, the host CPU 88 may use a lookup table to determine the CRC value for 48-bytes of zeros given any particular starting value and a particular CRC generator polynomial. In this situation, the lookup table may be stored in host memory, such as in memory 96 (FIG. 3). The resulting CRC value is then XORed with the CRC value received from the CRC generator 310 for the second cell in the same packet to generate a new CRC value. The resulting new CRC value is equivalent to calculating the CRC for the first two 48-byte cells in the packet.

The host CPU 88 continues this processing in a similar manner for the remaining cells in a packet having the same VPI/VCI including the last cell 250 in a data packet. That is, the host CPU 88 takes the previous value calculated after XORing with the cell CRC value as the starting value for a new calculation. The host CPU 88 then calculates a CRC value for 48-bytes of zeros, using the starting value and the particular CRC generator polynomial. Alternatively, the host CPU 88 may use a lookup table to determine the CRC value for 48-bytes of zeros based on any particular starting value and CRC generator polynomial. The host CPU 88 then XORs that result with the cell CRC value received from CRC generator 310 for the next cell in the same packet.

Generating the CRC in this manner to include the last eight bytes of the ATM packet, which includes CRC field 240 (FIG. 4B), results in an expected CRC value based on the particular CRC generator polynomial employed. The host CPU 88 then compares the generated overall packet CRC value to the expected value at step 830. Next at step 840, the host CPU determines whether the generated CRC value equals the expected value. If the generated value equals the expected value, the host CPU 88 determines at step 850 that no error occurred during transmission of the packet. If the CRC does not equal the expected value, the host CPU 88 determines at step 860 that an error occurred during transmission, or reception, of the packet.

The host CPU 88 now knows that an error exists in the packet of data. Next, the host CPU 88 uses the cell based CRC values (FIG. 7 step 730) to localize the error to a particular portion of the packet at step 870. The host CPU 88 may accomplish this in any number of ways. For example, the host CPU 88 may compare the individual cell CRC values for a packet calculated at one particular part of the network with the corresponding cell CRCs value calculated for the packet on another part of the network, as described in more detail below. In this manner, the error may then be correlated to a specific cell that most likely contains the erroneous data.

Figure 9:
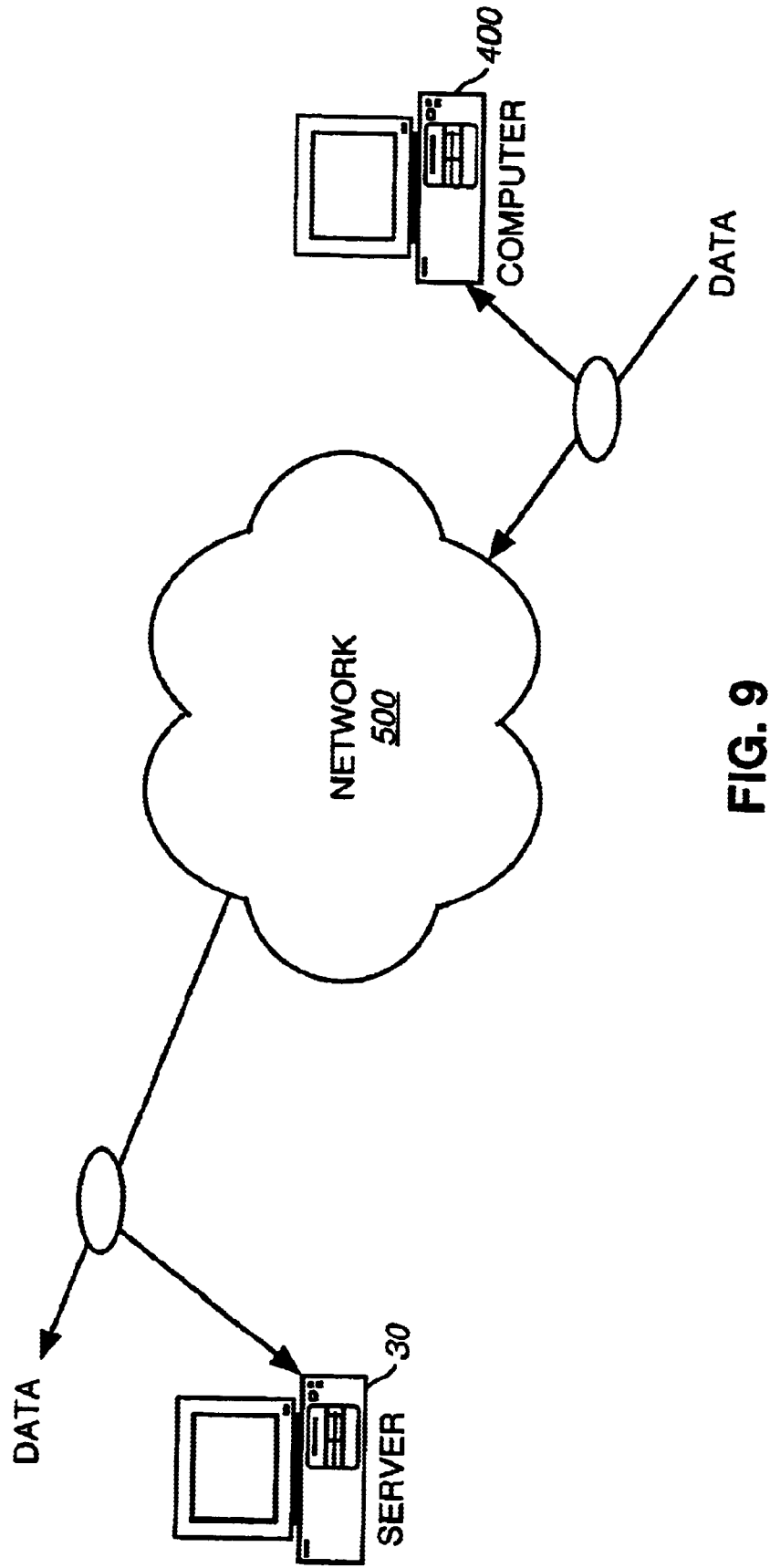
FIG. 9 is a diagram of a system in which the present invention may be employed.

FIG. 9 illustrates an exemplary system for localizing the error to a particular portion of the packet. Referring to FIG. 9, data monitoring computer 400 "sniffs", i.e., monitors, data transmissions on one portion of network 500. Computer 400 may send server 30 the CRC values calculated for each cell in a particular packet when the data packet was originally transmitted onto network 500. The computer 400 in this scenario performs the CRC calculation for each cell in the same manner as server 30. The server 30 may then compare the cell CRCs generated by computer 400 with the corresponding cell CRC values it generated. When the corresponding cell CRCs are not equal, the server 30 may identify the cell that most likely contains erroneous data. Knowing which particular cell in a packet contains the error may help in determining the cause of an error. For example, if the particular cell that contained the error was transmitted via a different link than other cells in the same packet, this may indicate a problem on that particular link in the network.

In alternative implementations consistent with the present invention, the cell CRC values and packet CRC values from server 30 and computer 400 may be transmitted to a central location where an error analysis processor compares the respective cell CRCs and determines whether an error occurred, the cell that may have caused the error and the likely cause of the error.

The present invention has been described in connection with a conventional SONET. The present invention may also be advantageously employed in a packet over SONET (POS) link as well. In a POS link, the cells of the packet are not interspersed and all bytes in a packet are sent in a continuous data stream. Additionally, in a POS link, POS packets may be broken into any size, not just 48-byte chunks, as long as the size is fixed and smaller than the smallest possible packet. In a POS link, the host CPU 88 does not have to keep track of the VPI/VCIs associated with the respective CRC values generated by CRC generator 310. The host CPU 88 merely performs the CRC calculation, as discussed in relation to FIG. 8. The host CPU 88 then compares the generated CRC to the expected value, as described previously. In this manner, the host CPU 88 may still be able to determine whether an error occurred, in addition to localizing the error to a particular cell.

Described has been a system and method for checking for errors in a network. An advantage of the invention is that errors in data transmissions may be identified in an efficient manner. Another advantage of the invention is that the error may be localized to a particular portion of a data packet, thereby facilitating determining a cause of the error. A further advantage of the invention is that the amount of memory required on a monitoring card may be reduced when performing error checking.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A method for checking a data transmission for errors, comprising:

receiving a stream of data comprising a plurality of cells, each cell including a header portion and a data portion, the header portion including a virtual path identifier (VPI) and a virtual channel identifier (VCI);

stripping the header portion from each of the plurality of cells;

generating a cyclic redundancy code (CRC) for the data portion of each of the plurality of cells;

calculating an overall CRC for a group of cells having the same VPI and VCI;

comparing the overall CRC to an expected value to determine whether an error exists;

determining that an error occurred when the overall CRC does not equal the expected value;

identifying a particular cell that contains erroneous data;

determining a link on which the particular cell that contains erroneous data has been transmitted; and comparing a plurality of links on which a plurality of particular cells that contains erroneous data has been transmitted.

2. The method of claim 1 wherein the group of cells forms a packet of data, the method further comprising:

generating an error indication representing an error in the packet of data when the overall CRC does not equal the expected value.

3. The method of claim 1, wherein the identifying step comprises examining the respective CRCs for each of the plurality of cells having the same VPI and VCI.

4. The method of claim 1, wherein the calculating an overall CRC step comprises:

calculating a CRC value for 48-bytes of zeros using a generated cell CRC value in a packet of data as the starting value;

XORing the calculated CRC value with a subsequently generated cell CRC value for a cell in the packet to generate a new CRC value; and repeating the calculating and XORing steps through the last cell in the packet.

5. The method of claim 1, further comprising:
transmitting the CRC for each of the plurality of cells to a host computer, wherein the host computer calculates the overall CRC.

6. The method of claim 5, wherein the transmitting step further comprises transmitting the CRC for each of the plurality of cells via at least one of a peripheral component interconnect bus and an accelerated graphics port bus.

7. The method of claim 1, wherein the group of cells forms a packet of data and the last cell in the packet includes a CRC value transmitted with the packet, wherein the generating step includes generating the CRC for the data portion of the last cell including the transmitted CRC value.

8. The method of claim 1 comprising the step of:
transmitting the CRC for the plurality of cells and the overall CRC for a group of cells to a central location for conducting error analysis.

9. A system for checking for errors in a packet of data transmitted over a network, comprising:
a cyclic redundancy code (CRC) generator configured to:
receive a stream of data comprising a plurality of cells, and
generate a CRC value for each of the plurality of cells; and a processing device coupled to the CRC generator and configured to:
receive the CRC value for each of the plurality of cells,
generate a packet CRC for a group of cells forming a packet of data,
compare the packet CRC to an expected value to determine whether an error exists in the packet,
generate an error indication representing an error in the packet of data when the packet CRC does not equal the expected value,
determine that an error occurred when the packet CRC does not equal the expected value,
identify a particular cell in the packet that contains erroneous data,
determine that a link on which the particular cell that contains erroneous data has been transmitted, and
compare a plurality of links on which a plurality of particular cells that contains erroneous data have been transmitted.

10. The system of claim 9, wherein the processing device is configured to examine the respective CRCs for each of the plurality of cells in the same packet to identify the particular cell that contains erroneous data.

11. The system of claim 9, wherein the processing device:
calculates a CRC value for 48-bytes of zeros using a generated cell CRC value in a packet of data as the starting value;
XORs the calculated CRC value with a subsequently generated cell CRC value for a cell in the packet to generate a new CRC value; and
repeats the calculating and XORing through the last cell in the packet to generate the packet CRC.

12. The system of claim 9, further comprising:
a peripheral component interconnect bus (PCI) coupled to the CRC generator, wherein the CRC generator is configured to transmit the CRC for each of the plurality of cells to the processing device via the PCI bus.

13. The system of claim 9, further comprising:
an accelerated graphics port (AGP) bus coupled to the CRC generator, wherein the CRC generator is configured to transmit the CRC for each of the plurality of cells to the processing device via the AGP bus.

14. The system of claim 9, wherein a last cell in the packet of data includes a CRC value transmitted with the packet, and the CRC generator is configured to generate the CRC for the last cell including the transmitted CRC value.

15. A method for checking for data transmission errors in a network where data is transmitted in packets, comprising:
receiving a packet comprising a plurality of cells each having a fixed length, wherein each packet includes a cyclic redundancy code (CRC) transmitted with the packet;
generating a CRC for each of the plurality of cells;
calculating a packet CRC for a group of cells in the same packet;
comparing the packet CRC to an expected value;
determining that an error occurred when the packet CRC does not equal the expected value;
identifying a particular cell that contains erroneous data, when the determining step determines that an error occurred;
determining a link on which the particular cell that contains erroneous data has been transmitted; and
comparing a plurality of links on which a plurality of particular cells that contains erroneous data have been transmitted.

16. The method of claim 15, wherein the calculating step includes:
calculating a CRC value for 48-bytes of zeros using a generated cell CRC value in a packet of data as the starting value;
XORing the calculated CRC value with a subsequently generated cell CRC value for a cell in the packet to generate a new CRC value; and
repeating the calculating and XORing steps through the last cell in the packet.

17. The method of claim 15, wherein a last cell in a group of cells forming the packet includes the CRC transmitted with the packet, and the generating step includes generating the CRC for the last cell in the group of cells forming the packet.

18. A system for checking for data transmission errors in a network where data is transmitted in packets, comprising:
a receiver configured to:
receive a plurality of cells from different packets interspersed in a stream of data, a last cell in each packet including a cyclic redundancy code (CRC) transmitted with the packet, and
strip a header portion from each of the plurality of cells;
a CRC generator configured to:
generate a CRC value for each of the stripped plurality of cells; and a processing device coupled to the CRC generator and configured to:
receive the CRC value for each of the plurality of cells,
calculate a packet CRC for a group of cells forming a packet of data;
compare the packet CRC to an expected value;
determine that an error occurred when the packet CRC does not equal the expected value;
identify a particular cell that contains erroneous data, when the processing device determines that an error occurred;
determine a link on which the particular cell that contains erroneous data has been transmitted; and compare a plurality of links on which a plurality of particular cells that contains erroneous data have been transmitted.

19. The system of claim 18, wherein the network is a synchronous optical network and the data is transmitted according to ATM adaption layer 5 format.

20. The system of claim 18, wherein the last cell in a group of cells forming the packet includes the CRC value transmitted with the packet, and the processing device generates the CRC for the last cell including the transmitted CRC value.

21. A system for checking for errors in a packet of data transmitted over a network, comprising:

means for receiving a stream of data comprising a plurality of cells;

means for generating a CRC value for each of the plurality of cells;

means for generating a packet CRC for a group of cells forming a packet of data;

means for comparing the packet CRC to an expected value to determine whether an error exists in the packet; and means for identifying a particular cell that contains erroneous data;

means for determining a link on which the particular cell that contains erroneous data has been transmitted; and means for comparing a plurality of links on which a plurality of particular cells that contains erroneous data have been transmitted.

\* \* \* \* \*